May 12, 1931. J. F. BOLGIANO 1,804,668
POWER TRANSMISSION
Filed July 12, 1924
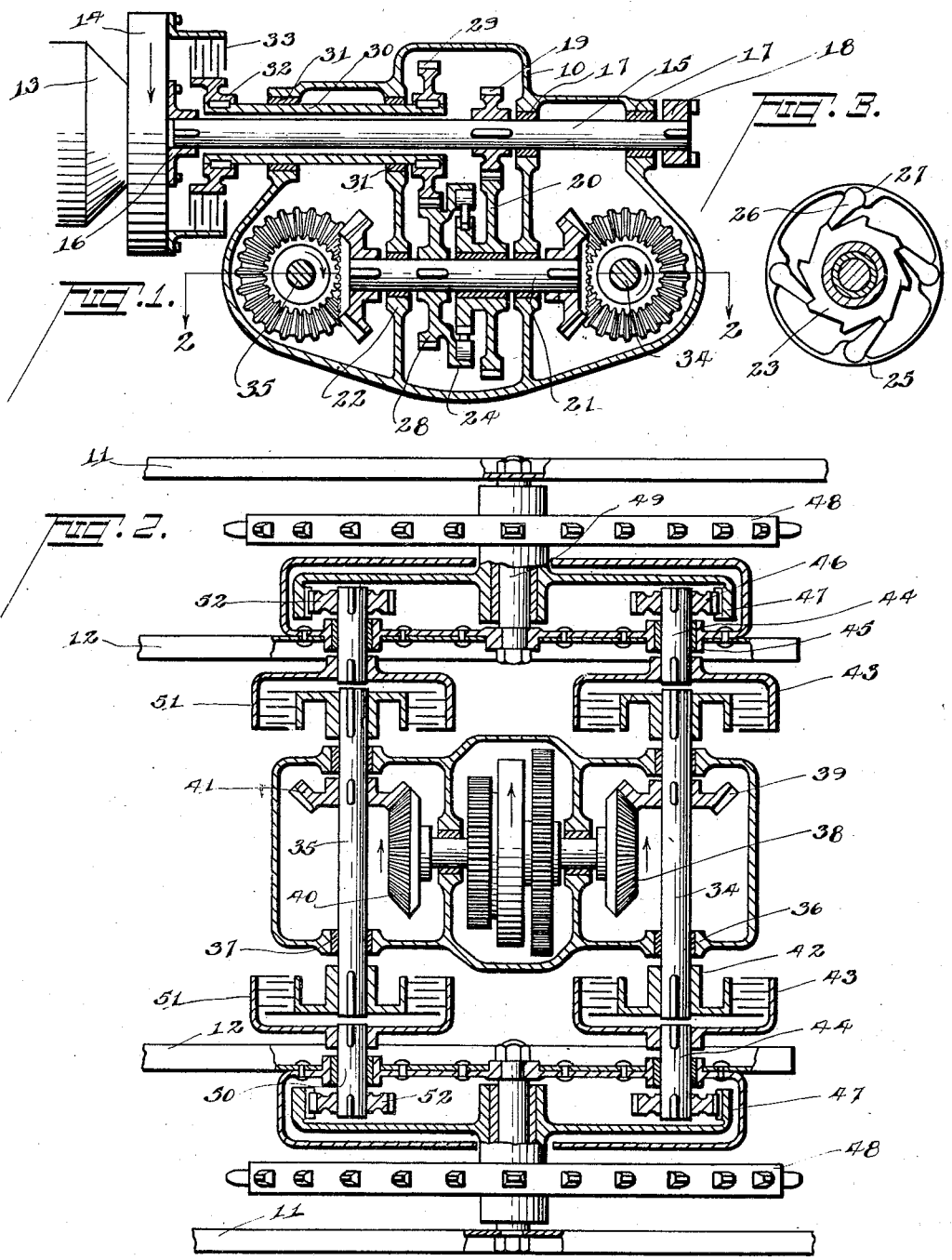
INVENTOR
John F. Bolgiano
BY Robert H. Young
ATTORNEY Patented May 12, 1931

1,804,668

UNITED STATES PATENT OFFICE

JOHN F. BOLGIANO, OF DAYTON, OHIO

POWER TRANSMISSION

Application filed July 12, 1924. Serial No. 725,594.

This invention relates to power transmissions, particularly designed and adapted for use on tractors, but capable of use generally with motor driven vehicles, or the like.

One of the objects of the invention is to provide a transmission whereby changes of speed are accomplished without disconnecting the driving relation of the traction elements.

Another object is to provide a power transmission whereby the changes of speed through a change of the gear ratios may be effected without shifting gears.

A still further object is to provide a power transmission whereby either of a pair of driven traction elements may be driven selectively in either direction, or both driven together in one direction, or both driven in opposite directions, as desired.

A further feature of the invention resides in the provision of a novel arrangement for providing a power take-off for utilizing the prime mover of the tractor to operate grinders and other small farm machinery without disturbing the transmission mechanism.

The foregoing and other objects of the invention are brought out in the course of the following detailed description and claims, reference being had to the accompanying drawing, in which:

Fig. 1 is a longitudinal vertical section through the power transmission of my invention.

Fig. 2 is a horizontal section taken on the line 2—2 of Fig. 1 looking in the direction of the arrows.

Fig. 3 is an isolated detail of the over-running clutch forming a part of the power transmission.

The transmission casing 10 containing the power transmission gearing of my invention is supported suitably between a pair of side frame members 11 in any convenient manner on a pair of intermediate sub-frame members 12 arranged in spaced parallel relation with the frame members 11. An engine 13 mounted on the sub-frame 12 in front of the casing 10 has a rotating fly wheel 14 which constitutes the driver element for the power transmission. A shaft 15 coupled directly with the fly wheel 14 as at 16, extends rearwardly through bearings 17 in the casing 10 and projects through the rear wall of the casing as shown in Fig. 1, where it is fitted with a coupling 18 to provide a power take-off for the operation of auxiliary equipment on a farm, such as grinders, shredders, and the like. The shaft 15 carries a low speed gear 19 meshing with a gear 20 rotatable freely on a countershaft 21 received in bearings 22 beneath the shaft 15 inside the casing 10. Gear 20 is formed integral with the under-running element 23 of an over-running clutch 24 on the shaft 21. The under-running element 23 as shown in Fig. 3 is in the form of a ratchet and is arranged to drive the over-running element 25, through a plurality of pawls 26 pivoted in bearings 27 in the over-running element 25. The latter is in the form of a shell, preferably formed integral with a gear 28 fixed on the shaft 21. The gear 28 meshes with a high speed gear 29 fixed on a sleeve 30 received in bearings 31 in the casing 10 and arranged in concentric relation to the shaft 15 where the latter is coupled to the fly wheel 14. The sleeve 30 has a spider 32 splined on the end thereof carrying the driven blades of a multiple disc clutch 33 on the fly wheel 14.

From the description thus far, it will appear that the engine normally drives the countershaft 21 at a low speed through the shaft 15, gears 19 and 20, clutch 24 and gear 28 and that when the clutch 32 is engaged, the countershaft 21 is driven at high speed through the gear 29 meshing directly with the gear 28. In this operation, the low speed gear 19 and 20 are still turning but the clutch 24 overruns. The pawls 26 moving with the shell 25 operating at a high speed, revolve freely about the ratchet 23 turning at a lower speed. A forward driven shaft 34 and a reverse driven shaft 35 extend transversely through bearings 36 and 37 respectively, in the casing 10 and have a permanent driving connection with the countershaft 21 through bevelled gears 38 and 39 at one end of the countershaft and bevel gears 40 and 41 at the other end of the shaft. The forward driven shaft 34 carries spiders 42 at opposite ends on which are mounted the driving discs of multiple disc clutches 43 for driving stub shafts received in bearings 45 in the subframe members 12. The shafts 44 have pinions 46 fixed thereon which mesh with internal teeth of ring gears 47 on driving sprocket wheels 48. The wheels 48 at opposite sides of the tractor, are mounted on separate axles 49 secured between the frame members 11 and 12 and are toothed as shown to operate the caterpillar tractor endless chain element at opposite sides of the tractor. In a similar wise to the shaft 34, the shaft 35 is arranged to be coupled at either end with stub shafts 50 through the medium of clutches 51 to drive reverse pinions 52 meshing with the ring gears 47 similarly as the pinions 46.

The operation of the transmission is as follows: With the clutch 33 disengaged, the countershaft 21 as previously stated, is driven at low speed, thus the forward driven shaft 34 and the reverse driven shaft 35 are likewise driven at low speed. Depending on whether either or both of the clutches 43 are engaged, either or both of the tractor wheels 48 will be driven in a forward direction. Thus, if only one clutch is engaged, say on the right hand side, the tractor will turn to the left about the stationary side. In a similar way, assuming clutches 43 are both disengaged, the tractor can be operated to the rear, either or both of the wheels 48 being driven in a reverse direction. In the negotiating of a turn in a very confined space, a forward clutch 43 and a reverse clutch 51 may be engaged, one on each side of the tractor, to drive both of the wheels 48 in opposite directions. Assuming movement is commenced in either direction on a straight-away, in low speed, the change to high speed may be effected simply by engaging the clutch 33. This operation, as previously stated, causes the clutch 24 to overrun and the shafts 34 and 35 are driven at a higher speed from the countershaft 21. In the change from low to high speed, it is apparent that the driven traction elements are not removed from driving relation with the engine 13. In a similar way, when the clutch 33 is disengaged when it is desired to operate at low speed, no disconnection of the driven traction elements from the engine occurs. The ratchet 23 simply picks up the shell 25 when the latter slows down to the speed of the ratchet. While I have not shown or described in detail a means for operating the clutch 33, and the clutches 43 and 51, it will be understood that the clutch 33 may be conveniently controlled by a foot pedal and that clutches 43 and 51 may be controlled by hand levers, or the like.

I claim:

1. In a tractor, a frame comprising two side frame members, a sub-frame comprising two intermediate side frame members, driven wheels, axles therefor between the frame and subframe members at each side of the tractor, a pair of shafts for each wheel journalled in said subframe members, pinions thereon, one being a forward driver and the other a reverse driver, gears on said wheels meshing therewith, and transmission gearing for selectively driving any one of said pinions on either side of said tractor or any two on opposite sides.

2. In a tractor, a frame, a pair of independent driver wheels at opposite sides of said frame, a power transmission mechanism between said wheels, two continuously driven forward and reverse unitary shafts connecting said wheels and being driven directly from said power transmission mechanism, gearing adjacent each end of said shafts for driving said wheels, and clutching means for selectively engaging the ends of said shafts with said gearing.

3. In a tractor, a frame, a pair of independent driver wheels at opposite sides of said frame, a power transmission mechanism between said wheels, two continuously driven forward and reverse unitary shafts extending transversely between said wheels and being driven directly from said power transmission mechanism, selective gearing for driving said shafts at different speeds, gearing permanently in mesh with the wheels adjacent each end of said shafts for driving said wheels, and clutching means for selectively engaging the ends of said shafts with said gearing.

4. In a tractor, a frame, a pair of independent driver wheels at opposite sides of said frame, a power transmission mechanism between said wheels comprising continuously driven forward and reverse shafts, low speed gears in constant driving relation with said shafts through the under-running portion of an over-running clutch, high speed gears selectively connected with the power means of the tractor having connection with said shafts through the over-running portion of the said over-running clutch, and means for selectively connecting said shafts with said driver wheels.

5. In a tractor, a frame, a pair of independent driver wheels at opposite sides of said frame, a power transmission mechanism between said wheels, comprising a pair of continuously driven shafts, one forward and one reverse, a countershaft, a permanent gearing connection between said shaft and said forward and reverse shafts, an over-running clutch on said countershaft, a low speed and a high speed gear on said countershaft, connected by said clutch, and means for selectively driving said low speed gear or said high speed gear with said low speed gear.

6. In a tractor, a driving element, a transmission casing, a power shaft having a permanent driving connection with said driving element extending through said casing, and providing a power take-off at the end projecting from said casing, a low speed gear fixed on said power shaft inside said casing, a sleeve about said power shaft extending from said driving element into said casing, a clutch for releasably engaging said sleeve with said driving element, a high speed gear on said sleeve, a driven shaft, a gear fixed thereon meshing with said high speed gear, another gear rotatable on said shaft meshing with said low speed gear, and a clutch between said gears on said driven shaft.

7. In a tractor having a driving element and traction wheels driven thereby, a transmission casing, a power shaft having a permanent driving connection with said driving element extending through said casing, and providing a power take-off at the end projecting from said casing, a forward driven shaft, a reverse driven shaft, gearing between said power shaft and said forward and reverse shafts in said casing, and clutches at opposite ends of said shafts to selectively provide a driving connection with said tractor wheels.

8. In a power transmission, a pair of drive shafts driven from the same power element, one of said shafts having a low speed gearing train driven thereby, the other having a high speed gearing train driven thereby, a clutch for selectively driving the latter shaft from said power element, a countershaft having a direct driving connection with said high speed gearing and having connection through an overrunning clutch with said low speed gearing, and a pair of propeller shafts driven in opposite directions from said countershaft.

9. In a power transmission, a pair of propeller shafts continuously driven in opposite directions, a low speed gear train, a high speed gear train, having driving connections with said shafts, an overrunning clutch between said gear trains, a clutch for selectively bringing into operation, or putting out of operation, one of said gear trains, and selectively operated clutches between said shafts and parts to be driven thereby.

10. In a power transmission, a drive shaft, driven shafts turning in opposite directions, low speed gearing and high speed gearing between the drive and driven shafts selectively brought into action to change the drive of said driven shafts from low to high, or vice versa, and an overrunning clutch between the drive and driven shafts permitting the speeding up or slowing down of said driven shafts during a continuous transmission of power from said drive shaft.

11. In a power transmission, a driver, two concentric drive shafts, one in constant driving relation and the other selectively driven through a clutch, a low speed gear driven by one shaft, a high speed gear driven by the other shaft, said low speed gear being continuously driven and said high speed gear being driven on engaging said clutch, a countershaft parallel with said drive shafts, gears on said countershaft including a high gear fixed thereon, and a low gear free thereon in constant mesh with said high and low speed gears, an overrunning clutch on said countershaft between said low and high gears, a forward driven shaft, and a rearward driven shaft, bevelled gearing between said countershaft, and said driven shafts in constant mesh, clutches at the ends of each of said driven shafts, and driven elements driven through said clutches.

12. In a power transmission, a driver, two drive shafts, one in constant driving relation and the other selectively driven through a clutch, a low speed gear driven by one shaft, a high speed gear driven by the other shaft, a countershaft, gears on said countershaft including a high gear fixed thereon, and a low gear free thereon in constant mesh with said high and low speed gears, an overrunning clutch on said countershaft between said low and high gears, a forward driven shaft, and a rearward driven shaft, gearing between said countershaft and said driven shafts in constant mesh, clutches at the ends of each of said driven shafts, and driven elements driven through said clutches.

13. In a tractor, a frame, a pair of driver wheels at opposite sides of said frame, a power transmission mechanism therefor between said wheels comprising a forward driving shaft and a reverse driving shaft extending transversely between said wheels, a driven countershaft extending parallel to the driver wheels in the same horizontal plane as the forward and reverse driven shafts and in geared relation therewith and a power shaft parallel to the countershaft and in geared relation therewith, and situated in a horizontal plane disposed above the first mentioned horizontal plane.

In testimony whereof I affix my signature.

JOHN F. BOLGIANO.